Patented Jan. 17, 1939

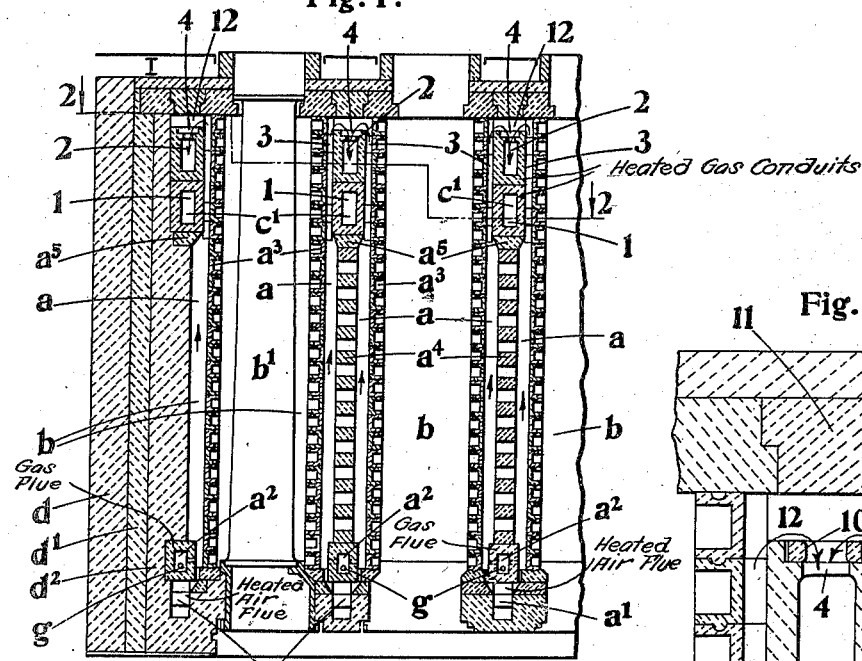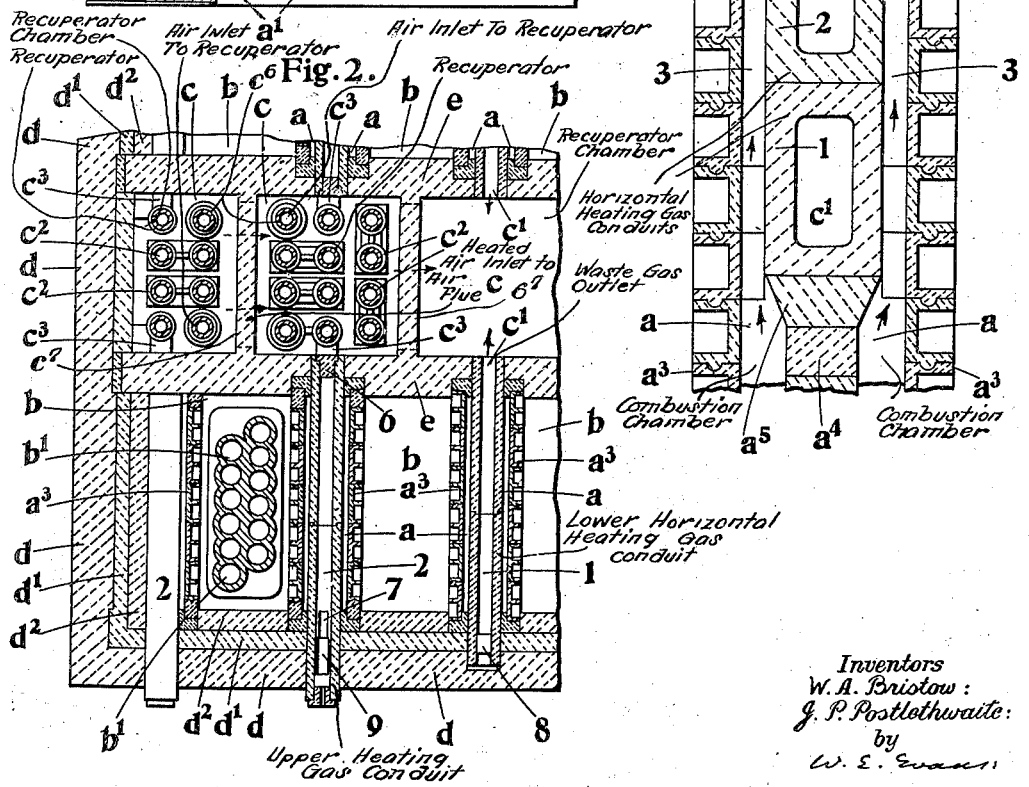

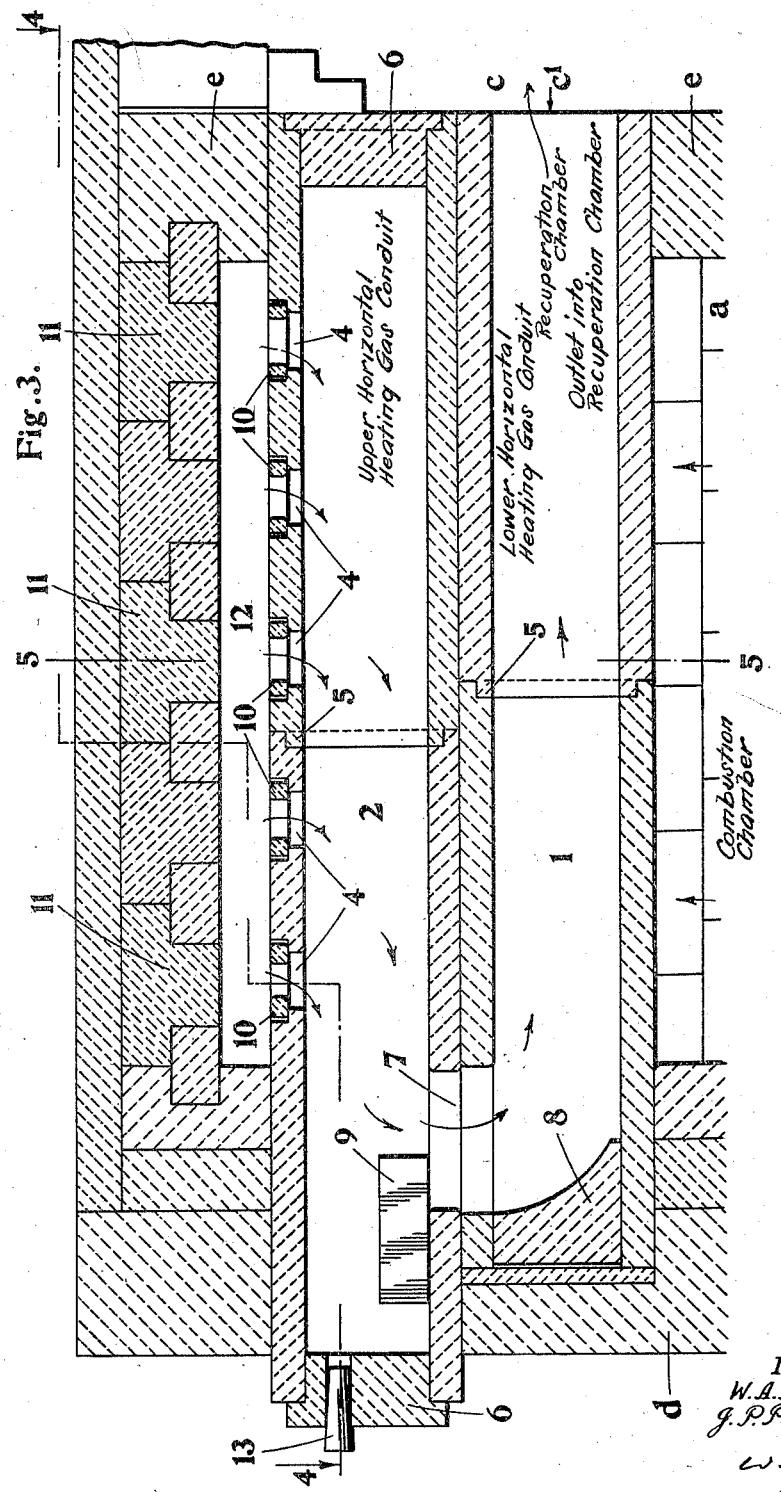

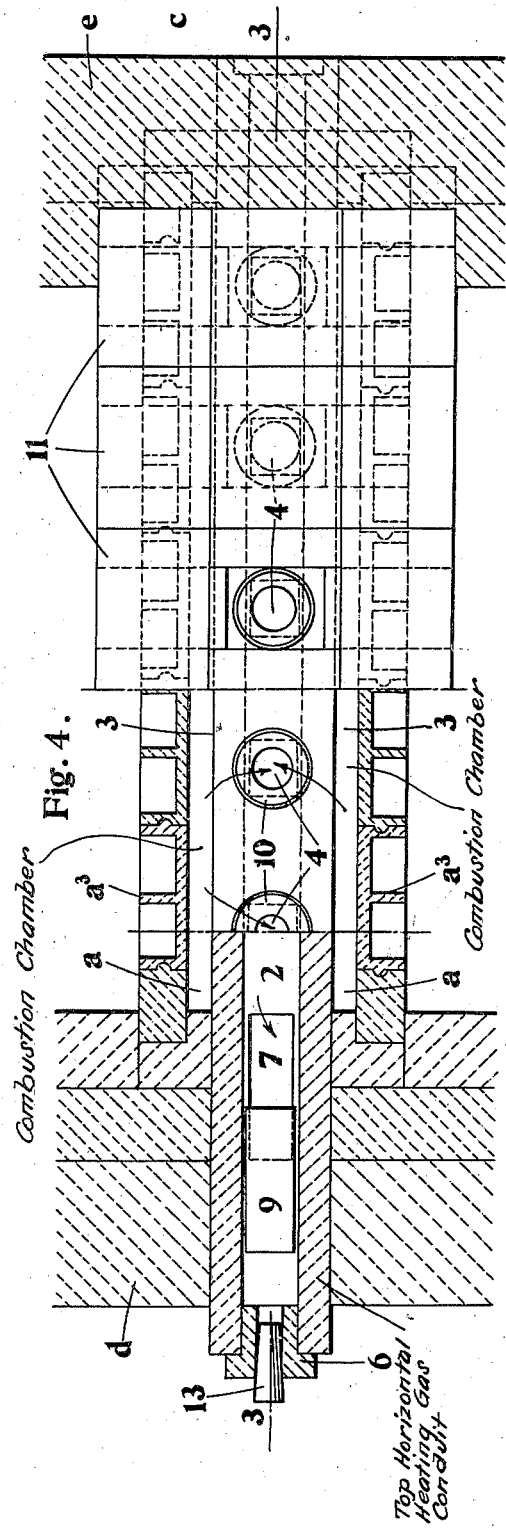

2,143,972

UNITED STATES PATENT OFFICE 2,143,972

SETTING OF RETORTS FOR USE IN THE DISTILLATION OF SOLID CARBONACEOUS SUBSTANCES

Whiston Alfred Bristow and Joseph Pearson Postlethwaite, London, England, assignors to Low Temperature Carbonisation Limited, London, England Application July 26, 1935, Serial No. 33,246
In Great Britain August 21, 1934

7 Claims. (Cl. 202—114)

This invention relates to settings of vertical retorts for use in the distillation or carbonization of solid carbonaceous substances such as coal, and especially at low or medium final temperatures.

The invention especially relates to settings of the kind described in the specification of the prior Patent No. 1,989,459.

The invention has among its objects to maintain heat at the upper part of the combustion chambers and to render the application of heat uniform in settings of vertical retorts, and particularly in the vicinity of the waste gas outlet from the combustion chambers on the flow of the waste gas outward as for example into laterally disposed recuperator chambers in which the waste heat of the gas by which heat is first applied to the retorts serves to pre-heat the air used for the combustion of the combustible gas used.

According to the invention instead of diverting the heating gas at the upper part of its course in its passage through the combustion chambers towards the waste gas outlets, the upward vertical flow of the heating gas is maintained at the upper part of its course by the provision in the upper part of the combustion chambers of conduits into which the heating gas finds access after first passing through the upper part of the combustion chambers, through which conduits it passes lengthwise in direction towards the waste gas outlet. Thus the course of the heating gas at the upper end of the combustion chambers is substantially increased and temperature maintained in the upper part of the combustion chambers under conditions in which heat is uniformly applied to the retorts at or near their upper ends.

According to the invention moreover a pair or set of conduits disposed one above the other is provided, in the uppermost of which gas inlet ports are provided through which the heating gas passes into the conduits to flow lengthwise: thus the uppermost conduit is closed at its respective ends and the heating gas may pass lengthwise of the uppermost conduit to discharge near the end opposite to that at which the waste gas outlet is situated, the gas thence passing into the conduit or conduits beneath, through which the gas flows in reverse direction to discharge into the waste gas outlet at the opposite end.

The invention comprises means for the regulation of the area of the gas inlet ports provided in the uppermost conduit, and means for regulation of the area of the port or ports through which the gas may flow from the uppermost conduit to that or those beneath it.

The invention comprises the features hereinafter described including those involved in the application of the invention to a construction of the kind of the prior patent aforesaid.

The present invention is illustrated in the accompanying drawings by way of example as applied to a construction of retort setting according to the prior patent aforesaid. In the accompanying drawings:

Figure 1 is a partial longitudinal sectional elevation through a series of alternate combustion chambers and retort chambers of a brickwork setting.

Figure 2 is a sectional plan taken on the line 2—2 (Figure 1).

Figures 3, 4 and 5 are detail views on a larger scale, Figure 3 being a sectional elevation taken on the line 3—3 (Figure 4) through the upper part of the combustion chambers disposed between adjacent retort chambers, Figure 4 a corresponding sectional plan partly taken on the line 4—4 (Figure 3), and Figure 5 a corresponding vertical section taken on the line 5—5 (Figure 3) through the conduits in the upper part of the combustion chambers situated between adjacent retorts.

The construction of retort setting to which the present invention is shown applied in the accompanying drawings is described in the specification of the prior United States patent hereinbefore referred to being of substantially rectangular form comprising two series of alternate retort chambers $b$ for the retorts $b^1$ and co-extensive combustion chambers, $a$, $a$ and a series of recuperator chambers $c$ centrally disposed between parallel longitudinal dividing walls $e$, $e$, separating the series of recuperator chambers $c$ from the series of alternate retort chambers $b$ and combustion chambers $a$, $a$. The retorts $b^1$ may advantageously be of known kind that are of small diameter and of gradually increasing diameter towards the lower end at which the residue of distillation is discharged, a number of closely adjacent retort cavities being formed in a single casting as indicated in Figure 2. The outer walls of the setting $d$ have a non-conducting lining $d^1$ and an inner fire-brick lining $d^2$. The combustion chambers $a$, $a$ are formed by a centrally disposed wall $a^4$ of refractory bricks, that may be spaced apart at intervals to form openings through the wall, there being provided at each side lateral walls $a^3$, $a^3$ of refractory box or cavity bricks, one lateral wall $a^3$ at each side forming with the centrally disposed wall $a^4$ a combustion chamber $a$ in position between. The combustion chambers $a, a$ are in communication with the recuperator chambers $c$ through the outlets $c^1$ at the upper end of the dividing walls $e, e$.

The combustion air may be supplied by a fan through an air supply pipe advantageously extending beneath the recuperators, and the combustion air passes through the connected vertical sections of two sets of recuperator pipes $c^2$ mounted in the respective recuperator chambers $c$, the air being supplied to the respective sets of recuperator pipes $c^2$ through the supply pipes whereby the air passing through the recuperator pipes is heated to supply heated combustion air to the combustion chambers $a, a$ disposed at opposite sides of the recuperator chambers, and thus the heated air is admitted at $c^3$ passing through pipes extending through the longitudinal walls of the setting between which the recuperator chambers $c$ are disposed, the heated air thence passing to the respective air flues or passages $a^1$ in the lower part of the setting whence the air passes upwardly at each side of the corresponding gas conduit $a^2$ through series of vertical passages into the combustion chambers $a, a$. The air supply pipes that extend beneath the setting are connected to the respective base fittings $c^6$. The gas may be admitted to the gas flue or conduits $a^2$ through a length of gas piping $g$ extending from the respective outer longitudinal walls $d$ of the setting and the gas leaves the gas conduits $a^2$ through a series of horizontal holes adjacent the vertical air admission holes leading from the air passage $a^1$. Hot waste gas derived from the combustion chambers $a, a$ at each side of the setting passes through the outlets $c^1$ into the respective recuperator chambers $c$ and traverses the respective recuperator chambers passing from one to the other in the series at the lower ends of the chambers through openings provided below supporting arches at $c^7$, whereby the waste gas is eventually discharged through a chimney at one end of the setting.

It will be understood that the combustion air from the supply pipes that extend beneath that part of the setting in which the recuperator chambers $c$ are provided supply air through the base fittings $c^6$ of the respective sets of recuperator tubes the air passing alternately upward and downward through bends and thence issue from the respective sets of recuperator tubes through the pipes $c^3$, the air in its course through the recuperator tubes being heated by the waste gas that passes into the respective recuperator chambers through the respective outlets $c^1$, the waste gas thus passing from chamber to chamber beneath the arches $c^7$ that support a partition wall extending at the upper part of the recuperator chambers.

It will be understood that the gas passes from the gas flue $a^2$ through lateral holes into the respective combustion chambers $a$, the hot gases thence passing up the combustion chambers and past the respective conduits 1 and 2 and on reaching the upper end of their course they pass through the holes 4 at the upper part of the conduit 2 and traverse that conduit to flow through the passage 7 into the lower conduit 1, the waste gas thence flowing through the outlets $c^1$ into the respective recuperator chambers.

In carrying the present invention into effect as illustrated in the accompanying drawings, the central wall $a^4$ does not extend to the upper end of the combustion chambers $a, a$, but is built to accommodate and support at its upper end a pair of superposed conduits 1, 2 advantageously formed of hollow blocks of fire brick of a rectangular form in vertical cross-section advantageously having a greater height than width, and a width greater than that of the main part of the central wall $a^4$ by which they are supported upon supporting blocks $a^5$ (Figure 5), to yield spaces 3 at each side in extension of the combustion chambers $a, a$ through which the heating gas passes thence to the upper end 12 and to enter a series of gas inlet ports 4 provided at the top of the upper conduit 2.

The conduits 1, 2 may advantageously be formed of two or more connected hollow blocks moulded or formed in determined lengths or parts engaging in alignment by a joint 5. The conduits 1, 2 extend at their respective ends to be supported by the division walls $e$ and outer longitudinal wall $d$ of the setting. The upper conduit 2 at each end is closed advantageously by a close fitting luted stopper or plug 6, while the conduit 1 beneath is similarly closed at its outer end and at its opposite end is open to the adjacent recuperator chamber $c$. The plugs 6 extending outside the outer longitudinal walls $d$ of the setting are advantageously provided with a sighting hole that may be closed by a tapered plug 13 by which the temperature conditions within the upper conduit may be observed. Near the outer ends a port 7 of considerable area is provided in the lower part of the upper conduit 2 in coincidence with another port in the upper part of the lower conduit 1, and these ports are adapted to be partially closed to the extent required for regulation by means of a sliding damper 9; the gas inlet ports 4 are provided with flanges or seats for the reception of fire clay rings 10 having central holes of variable diameter. Thus the fire clay rings 10 may be so arranged that the central holes gradually decrease in diameter towards the outer ends of the conduit 2 in direction towards the ports 7 and removable caps 11 may be provided in the top of the setting in positions coincident with the gas inlet holes 4 in the upper conduit 2 for the purpose of ready access to the fire clay rings 10 and the upper conduit 2. A stopper or plug 8 at the outer end of the lower conduit 1 may have its inner part shaped for guiding the incoming stream of gas in direction towards the outlet $c^1$ and the recuperator chamber $c$ into which the waste gas discharges.

It will be understood that the sets of transverse conduits 1, 2 may be of any number, communicating alternately in pairs at opposite ends, but preferably sets of two only are provided. Such sets of transverse conduits may extend downwardly to any variable extent and may be provided of such number and dimensions as to increase to the desired extent the cross-sectional area of the conduits and the course of the heating gas.

It will be understood that the conduits 1, 2 above the combustion chambers $a$ at the ends of the setting are provided in similar manner to be supported on blocks $a^5$ from the end wall $d^2$ of the setting while a corresponding gas conduit $a^2$ and air passage $a^1$ is provided having only one series of outlet holes respectively for gas and air issuing at the lower end of the single combustion chamber $a$.

It will be understood that the invention is not limited in its application to the construction of setting of the prior patent, but is of general application as a means of ensuring greater uniformity in the application of heat in vertical retorts in the vicinity of the waste gas outlet from the combustion chamber or combustion chambers that extend between or beside the retorts.

We claim:—

1. In settings of vertical retorts for the distillation of solid carbonaceous substances such as coal in which combustion chambers are disposed intermediate and beside successive retorts of the series, means for maintaining the application of heat at the upper part of the combustion chambers comprising means for the admission of a combustible gaseous mixture at the lower end of the combustion chamber between and beside adjacent retorts in the series and conduits set in transverse position between the said retorts near the upper end of the setting, said conduits having their lateral walls spaced apart from the walls of the combustion chambers to yield narrow interstitial spaces at each side of the conduits, whose lateral walls are thus accessible externally to the hot gases from the respective combustion chambers beneath them, the said conduits having inlet apertures at their upper parts through which the hot gases from the combustion chambers may enter after passing upwardly through the said interstitial spaces and outlets from which the said gases may discharge at one end of the conduits for the lengthwise flow of the gases therein.

2. In settings of vertical retorts for the distillation of solid carbonaceous substances such as coal in which combustion chambers are disposed intermediate and beside successive retorts of the series, means for maintaining the application of heat at the upper part of the combustion chambers comprising a set of conduits in which the conduits are disposed in vertical series in transverse position between and beside retorts in the series near the upper end of the setting, the top conduit of the sets of conduits being accessible externally to the hot gases from the respective combustion chambers beneath them, the top conduit of the respective sets having apertures at the upper part through which the hot gases from the combustion chambers may enter and an outlet for the gases at one end for the lengthwise flow and discharge of the gases flowing therein, while the bottom conduit of the respective sets has a discharging outlet at that end opposite to that through which the gases enter from the conduit next above it.

3. In settings of vertical retorts for the distillation of solid carbonaceous substances such as coal in which combustion chambers are disposed intermediate and beside successive retorts of the series, means for maintaining the application of heat at the upper part of the combustion chambers comprising a set of conduits in which the conduits are disposed in vertical series in transverse position between and beside retorts in the series near the upper end of the setting, the top conduit of the sets of conduits being accessible externally to the hot gases from the respective combustion chambers beneath them, the top conduit of the respective sets having apertures at the upper part through which the hot gases from the combustion chambers may enter and an outlet for the gases at one end for the lengthwise flow and discharge of the gases flowing therein, while the bottom conduit of the respective sets has a discharging outlet at that end opposite to that through which the gases enter from the conduit next above it, and means for regulating the flow of gas entering through the apertures at the upper part of the top conduit of the respective sets comprising rings varying in internal diameter.

4. In settings of vertical retorts for the distillation of solid carbonaceous substances such as coal in which combustion chambers are disposed intermediate and beside successive retorts of the series, means for maintaining the application of heat in the upper part of the combustion chambers comprising a set of two conduits disposed in vertical series in transverse position between and beside the retorts in the series near the upper end of the setting, the said conduits being accessible externally to the hot gases from the respective combustion chambers beneath them, the top conduit having apertures in the upper part thereof through which the hot gases from the combustion chambers may enter and an outlet for the gases at one end for the lengthwise flow of the gases therein, and the bottom conduit of each set having a discharging outlet at the end opposite to that at which the gases enter it from the top conduit.

5. In settings of vertical retorts for the distillation of solid carbonaceous substances such as coal in which combustion chambers are disposed intermediate and beside successive retorts in series, means for maintaining the application of heat in the upper part of the combustion chambers comprising a set of two conduits disposed in vertical series in transverse position between and beside the retorts in the series near the upper end of the setting, the said conduits being accessible externally to the hot gases from the respective combustion chambers beneath them, the top conduit having apertures in the upper part thereof through which the hot gases from the combustion chambers may enter and an outlet for the gases at one end for the lengthwise flow of the gases therein, and the bottom conduit of each set has a discharging outlet at the end opposite to that at which the gases enter it from the top conduit, and a damper for the regulation of the flow of gases from the top to the bottom conduit of each set.

6. In settings of vertical retorts for the distillation of solid carbonaceous substances such as coal in which combustion chambers are disposed intermediate and beside the successive retorts of the series and in which the combustion chambers are divided into two parts by a centrally disposed wall from both of which parts the heating gases pass upwardly, means for maintaining the application of heat at the upper end of the respective parts of the combustion chambers comprising conduits disposed in transverse position between and beside adjacent retorts in the series near the upper end of the setting, the conduits being supported upon the centrally disposed wall by which the combustion chamber is divided, the said conduits having their lateral walls spaced apart from the walls of the combustion chambers to yield narrow interstitial spaces at each side of the conduits, whose lateral walls are thus accessible externally to the hot gases from the respective combustion chambers beneath them, the conduits having inlet apertures at their upper parts through which the hot gases from the combustion chambers may enter after passing upwardly through the said interstitial spaces, and outlets through which the gases may discharge at one end of the conduits for the lengthwise flow of the gases therein.

7. In settings of vertical retorts for the distillation of solid carbonaceous substances such as coal in which combustion chambers are disposed intermediate and beside successive retorts in the series and in which the combustion chambers are divided into two parts by a centrally disposed wall from both of which parts the heating gases pass upwardly and in which lateral walls are disposed at each side of the central wall to form the combustion chambers at each side of the central wall, means for maintaining the application of heat at the upper part of the respective combustion chambers comprising a set of conduits disposed in transverse position between and beside adjacent retorts and the lateral walls of the combustion chamber near the upper end of the setting, the set of retorts having their lateral walls spaced apart from the lateral walls of the combustion chambers to yield narrow interstitial spaces at each side of the conduits whose lateral walls are thus accessible externally to the hot gases from the respective combustion chambers beneath them, the top conduit of the set having inlet apertures at its upper part through which the hot gases from the combustion chambers may enter and outlets for the gases at one end of the conduits of the set for the lengthwise flow of the gases and their discharge therefrom.

WHISTON ALFRED BRISTOW.
JOSEPH PEARSON POSTLETHWAITE.